Nov. 10, 1942.        J. W. APPLEY        2,301,501
MOLDING MACHINE FOR PLASTIC MATERIAL
Filed March 7, 1941          2 Sheets-Sheet 1

INVENTOR
JAMES W. APPLEY
By Edward M Fisher
ATTORNEY

Patented Nov. 10, 1942

2,301,501

UNITED STATES PATENT OFFICE 2,301,501

MOLDING MACHINE FOR PLASTIC MATERIAL

James W. Appley, St. Petersburg, Fla.

Application March 7, 1941, Serial No. 382,173

3 Claims. (Cl. 25—41)

This invention relates to improvements in a molding machine for plastic material.

Principal object of this invention is to provide a simple inexpensive machine of the kind whereby concrete and other material in a plastic state is thoroughly tamped and molded at a uniform density by its own gravity and which is accomplished by providing a machine wherein an arrangement of eccentrics sets up a horizontal vibratory action to the core box, said vibratory action being balanced by spring mechanism associated with said core box.

With this and other objects in view, as will more fully appear, the invention consists of the mold structure and arrangement of associated parts hereinafter described, illustrated in the accompanying drawings and particularly pointed out in the claims, it being understood that various changes in size, proportion, and minor details of the structure may be made without departing from the spirit of the invention.

I attain these objects by structure illustrated in the accompanying drawings, wherein.

Similar reference characters refer to similar and like parts throughout the drawings.

Figure 1:
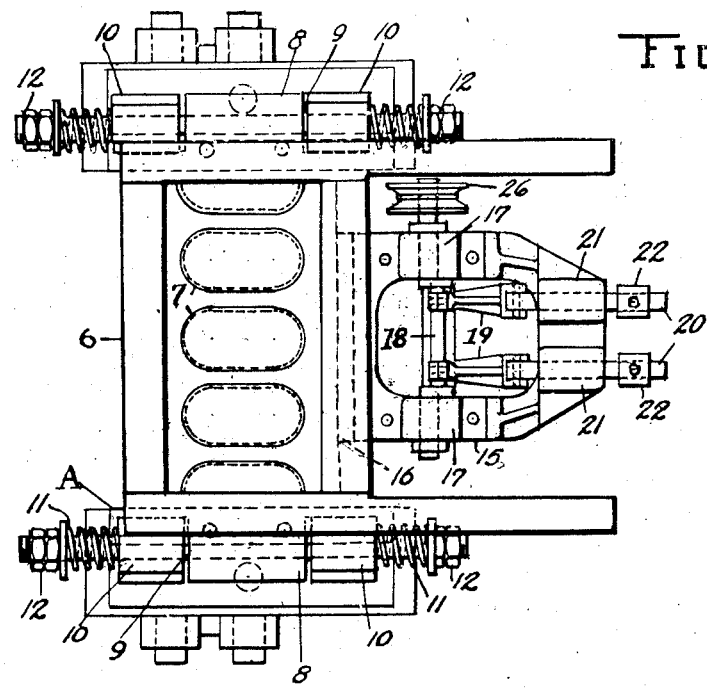
Fig. 1 is a plan view of my machine, with the hopper removed.
Figure 2:
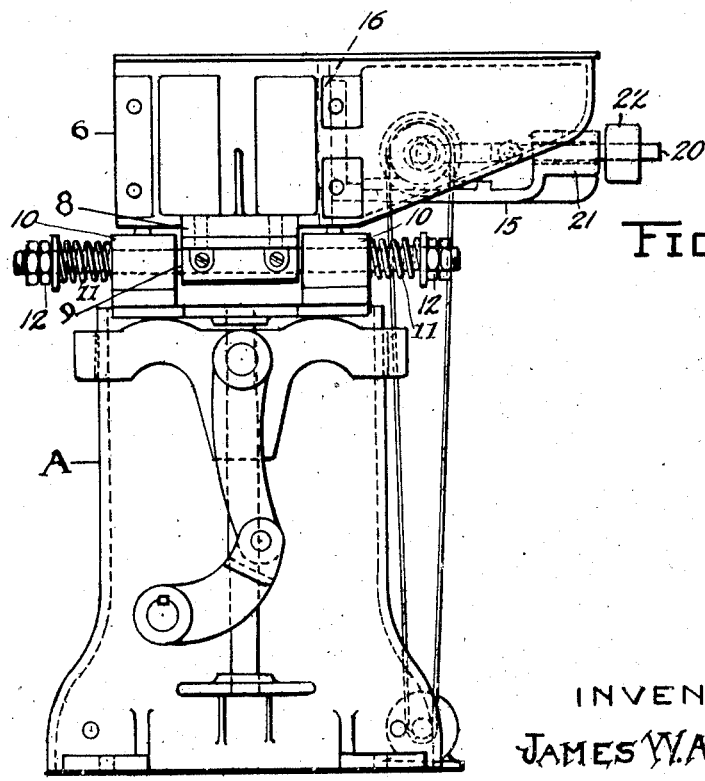
Fig. 2 is an end view thereof.
Figure 3:
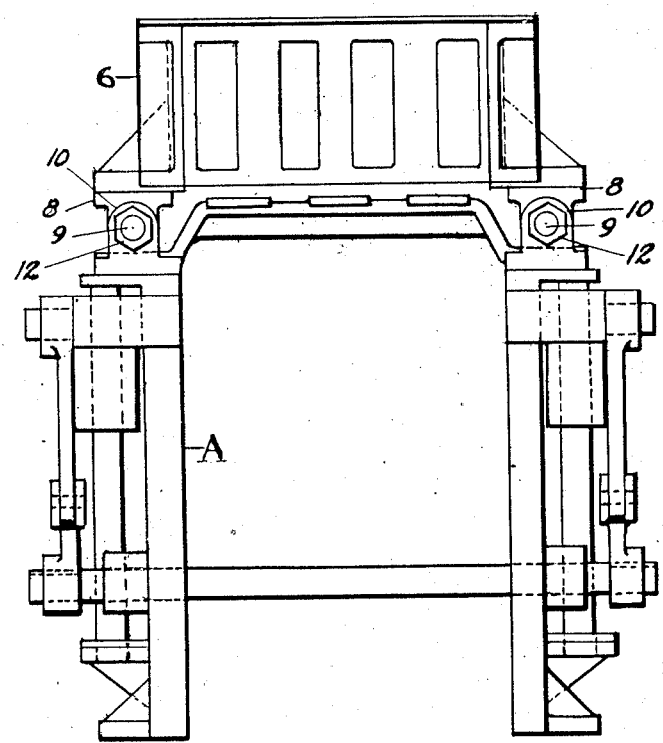
Fig. 3 is a front view thereof.
Figure 4:
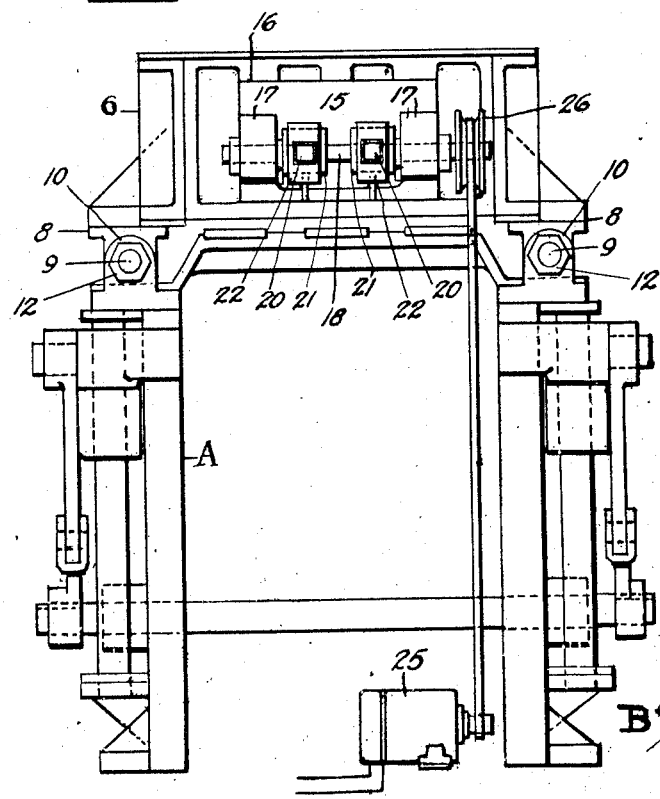
Fig. 4 is a rear view thereof.

Now referring more particularly to the details of my preferred form of structure A indicates a supporting frame composed of uprights and suitable cross members.

Mounted upon and arranged for horizontal transverse vibratory movement, as to said frame, is a core box 6 which may be of any desirable size and adapted to accommodate one or more cores as indicated by 7 or the like.

Said core box 6 is movably associated with said frame through shaft mounting members 8 which form a part of said core box at its opposite ends and which are fixedly engaged upon horizontal transverse shafts 9 slidably mounted in shaft mountings 10 for transversal movement.

As the core box 6 is transversally vibrated by eccentric power driven mechanism hereinafter described a transversal movement of the shaft 9 is set up and said movement is equalized by means of coil springs 11 engaged upon the outer opposite ends of the shaft 9 and intermediate the outer faces of the shaft mountings 10 and tension nuts 12.

Transversal vibratory movement of the core box 6 is set up by means of mechanism composed of a crank shaft bracket 15 bolted to or otherwise engaged in fixed position with the core box 6 upon its outer rear face as at 16, said bracket having oppositely, and longitudinally, disposed shaft mountings 17 for mounting of a crank shaft 18, having a single crank upon which are mounted crank arms 19 for conveying transverse movement to, substantially square in cross section, plungers 20 which are guided by bearings 21, said plungers having weights 22 of the desired size removably mounted upon the outer portion thereof.

Motive power for the rotation of the crank shaft 18 and transversal vibratory movement of said core box is provided by a motor 25 in contact with suitable power source and a belt extended therefrom to a belt pulley 26 fixedly engaged upon said crank shaft by a key or other suitable means.

From the above description it will be apparent to those skilled in the art that the details of construction illustrated herein may readily be varied without departure from the novel subject matter herein disclosed. I do not, therefore, desire to be strictly limited by the disclosure but rather by the claims granted me.

What is claimed is:

1. In a molding machine of the kind described, a rigid support, a core box supported for horizontal transverse vibratory movements by and above the support, sliding shafts coupling the support and box together and allowing motion to the latter, and tensioning elements carried by said shafts and active in opposition to each other against the latter for controlled vibration inherent to said core box.

2. In a molding machine of the kind described, a rigid support, a core box supported for horizontal transverse vibratory movements by and above the support, sliding shafts coupling the support and box together and allowing motion to the latter, tensioning elements carried by said shafts and active in opposition to each other against the latter for controlled vibration inherent to said core box, and means active directly on the box for vibration thereof.

3. In a molding machine of the kind described, a rigid support, a core box supported for horizontal transverse vibratory movements by and above the support, sliding shafts coupling the support and box together and allowing motion to the latter, tensioning elements carried by said shafts and active in opposition to each other against the latter for controlled vibration inherent to said core box, means active directly on the box for vibration thereof, and means for effecting bearings for the shafts and constituting coupling parts for the support and box.

JAMES W. APPLEY.